APPARATUS UNDER CONTROL OF TELEPHONE BELL THAT IS REMOTELY OPERATED

Filed Nov. 18, 1948

4 Sheets-Sheet 1

Inventor
Roland Favre
S. Ludael [illegible]
AGENT

May 15, 1951

R. FAVRE

APPARATUS UNDER CONTROL OF TELEPHONE BELL THAT IS REMOTELY OPERATED 2,553,084

Filed Nov. 18, 1948

4 Sheets-Sheet 2

Inventor
Roland Favre
Agent

May 15, 1951 R. FAVRE 2,553,084

APPARATUS UNDER CONTROL OF TELEPHONE BELL THAT IS REMOTELY OPERATED

Filed Nov. 18, 1948 4 Sheets-Sheet 3

Inventor
Roland Favre
By [signature]
AGENT

May 15, 1951 R. FAVRE 2,553,084

APPARATUS UNDER CONTROL OF TELEPHONE BELL THAT IS REMOTELY OPERATED

Filed Nov. 18, 1948 4 Sheets-Sheet 4

Inventor
Roland Favre
By [signature]
AGENT

Patented May 15, 1951

2,553,084

UNITED STATES PATENT OFFICE 2,553,084

APPARATUS UNDER CONTROL OF TELEPHONE BELL THAT IS REMOTELY OPERATED

Roland Favre, Paris, France

Application November 18, 1948, Serial No. 60,789
In France October 18, 1948

7 Claims. (Cl. 179—84)

This invention has for its object a method and an installation making it possible to control from one transmitting station one or more apparatuses located in a receiving station which is connected to the transmitting station through an electric line.

Said method consists essentially in passing through the line from the transmitting station a well-defined number of electric pulse series and in using at the receiving station said pulse series for closing an equal number of switches connected in series in a circuit which operates the apparatus to be controlled. Thanks to this method the operating circuit of the apparatus to be controlled may only be actuated when the operator has sent over the line the required number of pulse series.

In order that the operation of the apparatus to be controlled may be effected only by an authorized person, each one of the various pulse series corresponding to the various switches comprises an arbitrary selected and prearranged number of pulses, said numbers of pulses being liable to vary from series to series, and each switch is closed only when the particular series of pulses actuating said switch really comprises the pre-arranged number of pulses. These switches thus act in the same manner as a lock and they may be closed simultaneously only when the numbers of pulses selected for the various series of pulses are known. Said switches thus act as safety switches.

When it is desired to control independently of each other several separate apparatuses located at the receiving station and each of which is controlled by a separate operating circuit in which is inserted an individual switch, the closure of which operatively connects the apparatus which is to be subsequently controlled, that or those separate circuits which are to be controlled should be connected in series with the safety switches, and independently of the pulse series used to close the safety switches, there should be sent over the line from the transmitting station an additional series of pulses which is used at the receiving station to close the individual switch operatively connecting the apparatus to be controlled.

In order that the operator may realize that his order has been carried out the operation of the controlled apparatus is used to close at the receiving station an auxiliary check circuit which sends over the line a pulse which produces at the transmitting station a signal indicating to the operator that the operation of the apparatus to be controlled has really taken place.

It is therefore necessary when the above method is to be used that the transmitting and receiving stations be interconnected through an electric line.

The method of the invention as defined above may be materially improved according to another feature of the invention by using as an electric line for interconnecting the transmitting and receiving stations the telephone line which interconnects two telephone sets located at the said two stations, respectively. In this case, each one of the pulse series is produced by a ringing signal sent by the transmitting station to the telephone bell of the receiving station, each ringing signal comprising a number of pulses equal to the pre-arranged pulse numbers required to close the corresponding switch. Also in this case the auxiliary check circuit may cause the removal followed by the restoration of the telephone receiver of the receiving station which produces in the receiver of the telephone set of the transmitting station an audible signal which informs the operator that his order has been carried out. It will be understood that the method may therefore be used between any pair of stations interconnected by a telephone network without it being necessary to provide a special line therebetween; the utilization scope of the method may thus be materially increased.

A remote-control installation according to the invention comprises essentially a pulse responsive device interposed at the receiving station in the line interconnecting the transmitting and receiving stations, and a transmission gear actuated by said responsive device closes successively a well-defined number of switches connected in series in the operating circuit of the apparatus to be controlled.

Said responsive device may be of any type and may be constituted for example either by the armature of a magnet through which pass the pulses or by a means the shape of which may be varied by heat or by a galvanometer or by a photo-electric cell or by any other similar device.

Said responsive device may in turn operatively connect a relay intended to operate the transmission gear which closes the switches.

When the line interconnecting the two stations is one line of the telephone network the responsive device may be constituted by a magnet connected to the telephone bell of the receiving station.

The transmission gear between the responsive device and the switches may be infinitely varied. Theoretically each one of the switches is provided with a closing device adapted to be actuated by the responsive device, and a switching device also actuated by the responsive device associates successively the closing devices of the switches with the responsive device. Each one of the switch closing devices may comprise a delay device adjustable according to the number of pulses which should pass through the line in order to effect the closing of the switch.

In order that the invention may be better understood, one embodiment of the remote-control installation according to the invention will be described with reference to the accompanying drawings, wherein.

Figures 1, 2, 5, 7, 8, 9:
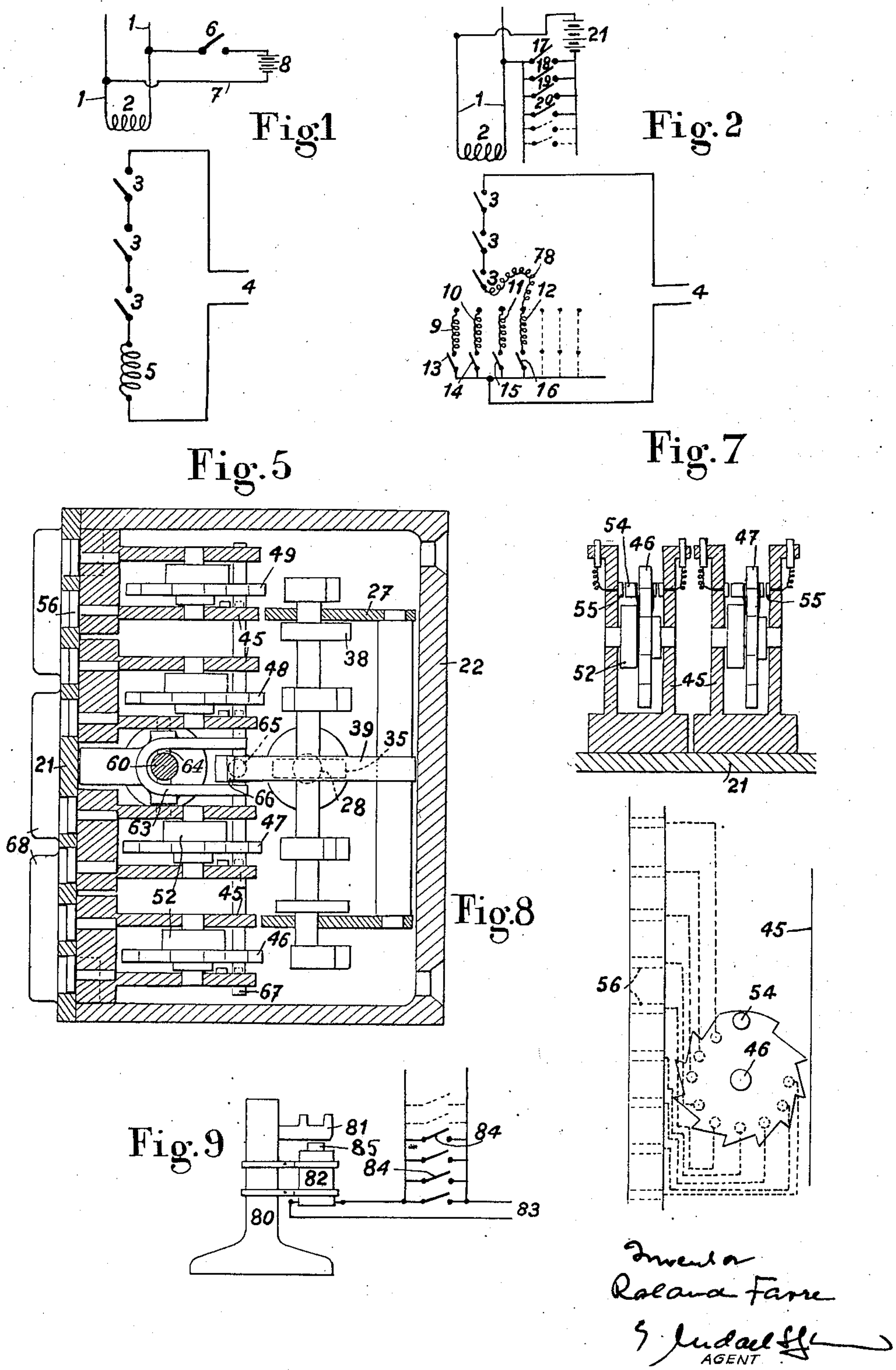
Figs. 1 and 2 are theoretical diagrams of electric circuits in the receiving station.
Fig. 5 is a section along line ABCD of Fig. 3.
Fig. 7 is a part section of the safety switches.
Fig. 8 is an elevational view of one of the walls showing the arrangement of the contacts on said walls.
Fig. 9 shows the device for checking the operation to be controlled.

Fig. 1 shows diagrammatically the general principle of the invention. At the receiving station there is interposed in line 1 which connects the transmitting station to the receiving station a responsive means 2 such as a magnet. There is sent from the transmitting station a well-defined number of pulse series which pass through magnet 2. Each series of pulses acts through magnet 2 upon contacts 3 connected in series in a circuit 4 so as to close one of said contacts and to cause the next following contact to cooperate with magnet 2. If circuit 4 comprises a number $n$ of contacts 3 it will be necessary that the operator sends from the transmitting station $n$ series of pulses in order to close said $n$ contacts 3. In circuit 4 is connected in series the apparatus to be controlled 5 which may be any type, either a lamp to be illuminated or a heating resistor, or a relay adapted to operate a machine or other apparatus, etc. In order to prevent apparatus 5 to be controlled from being operatively connected by non-authorized persons, each contact 3 is provided with an adjustable delay device which only closes the contact when the series of pulses sent into line 1 and intended to close said contact comprises an arbitrarily selected number of pulses. Thus if there are three contacts 3 and if the operator adjusts the delay devices so that the first contact 3 is only closed after a series of four pulses, the second contact after a series of six pulses, the third contact after a series of two pulses, it will be necessary in order to control apparatus 5 that the operator knows the numbers of pulses, viz. 4, 6, 2 respectively selected for each one of the pulse series. Said contacts 3 will thus act as a safety lock preventing apparatus 5 from being controlled by malicious persons. Furthermore there may be any number of said safety contacts 3.

When apparatus 5 has been actuated under the action of the successive pulses sent by the transmitting station, a means acted upon by said apparatus and which will be further explained closes a switch 6 connected at the receiving station in a circuit 7 including a current source 8 and branched off the line. The closure of switch 6 thus produces in the line a pulse which upon being sent to the transmitting station may produce in said transmitting station a signal informing the operator that his order has been carried out.

If it is desired to remotely control a plurality of separate apparatuses disposed at the receiving station and capable of being operated electrically, said separate apparatuses 9, 10, 11, 12 . . . are connected in separate circuits each of which is provided with a switch 13, 14, 15, 16 . . . as shown in Fig. 2; each one of these various circuits may be connected in series with safety contacts 3 by means of a selection lead 78. The individual switches 13, 14, 15, 16 . . . operatively connecting apparatus 9, 10, 11, 12 . . . are controlled as well as contacts 3 from magnet 2 by means of an additional series of pulses sent by the transmitting station according to the number of pulses of said additional series of pulses. Thus switches 9, 10, 11, 12 will be closed by an additional series of pulses comprising 1, 2, 3, 4 . . . pulses, respectively. Only that or those apparatus which are connected through lead or leads 78 will be set into operation.

It may be pre-arranged that the various apparatus 9, 10, 11, 12, be switched on by adjusting in the same manner the various delay devices of contacts 3, that is to say according to the same key combination e. g. 4, 6, 2. However one apparatus may be switched on for a given key combination and another apparatus for another key combination. It is thus also possible to pre-arrange that said various apparatuses 9, 10, 11, 12 be switched on for different adjustments of the delay devices. When the order of the operator has been carried out, means acted upon by the various apparatuses to be controlled close the particular switch 17, 18, 19, 20 . . . which corresponds to the controlled apparatus, said switches being connected in parallel in a circuit containing a current source 21 and branched off line 1 so that a signalling impulse traversing said circuit will produce at the transmitting station a signal informing the operator that his order has been carried out.

The method according to the invention permits a considerable increase of the utilization scope if using the telephone network which ensures the electric interconnection of two telephone sets located at any distance from each other. It is known that a ringing signal produces in the bell of the receiving station a series of equally spaced pulses which results in a sequence of trills interrupted by small intervals of silence. Each one of said trills corresponds to a pulse so that the operator who hears in his telephone receiver the ringing of the receiving station may count the number of trills or pulses comprised in each call he sends. The operator may thus hang up his telephone receiver whenever he has reached during a call the number of pulses required to close the suitable contact 3 or one of switches 13, 14, 15, 16 switching on the apparatus to be controlled. When the ordered operation is carried out the controlled apparatus closes a switch interposed in a circuit comprising a magnet which acts upon the switch-hook of the telephone handset so as to lift said switch-hook and to let it drop back at once which produces in the telephone set of the transmitting station a clearly recognizable signal which informs the operator that his order has been carried out.

Thanks to the method according to the invention and by using without any modification the telephone network of a State Administration, it is possible to control, check or stop any operation at any time and at any place from any other place, however distant it may be from the first one.

The mechanisms making it possible to effect the operations mentioned above may have the most variegated forms. The embodiment described hereunder is thus only to be considered as an illustration which does not limit the scope of the invention. It will be assumed in said illustration that an automatic telephone network is used.

The transmitting station is constituted by the conventional telephone set to which no modification needs to be made.

At the receiving station there is added to the conventional telephone set a gear which may be contained in a cabinet constituted by a plate 21 on which are arranged the various parts of the gear and by a cover 22 having the shape of an inverted box. A magnet 23 consuming a very low current power is connected in parallel across the bell of the telephone set of the receiving station, a switch being interposed therebetween. Said magnet receives the same pulses as the bell and closes upon each pulse a contact 24 interposed in a circuit which comprises a magnet 25 and which is branched off a current source such as the electric mains. Said magnet 25 thus also receives the same pulses as the bell, but with a far higher intensity in order to ensure the operation of the parts described hereunder. With magnet 25 cooperates a core 26 made of steel or soft iron and which is integral with a frame 27 and a rod 28 aligned therewith. Said rod 28 bears at its end a piston 29 working in a stationary cylinder 30 filled with a liquid and having three various bores 31, 32, 33, bore 32 just accommodating piston 29, while bores 31 and 33 have a diameter materially larger than that of the piston. Said piston 29 is drilled and supports a flap-valve 70 so that the piston may be moved quickly in the direction opposite to that of arrow *f*, flap-valve 70 being then freely lifted, while said piston may be moved only more slowly in the direction of arrow *f* particularly when said piston lies opposite bore 32, for in this case the valve is kept on its seat. Piston 29 and cylinder 30 thus constitute a dash-pot.

Figure 3:
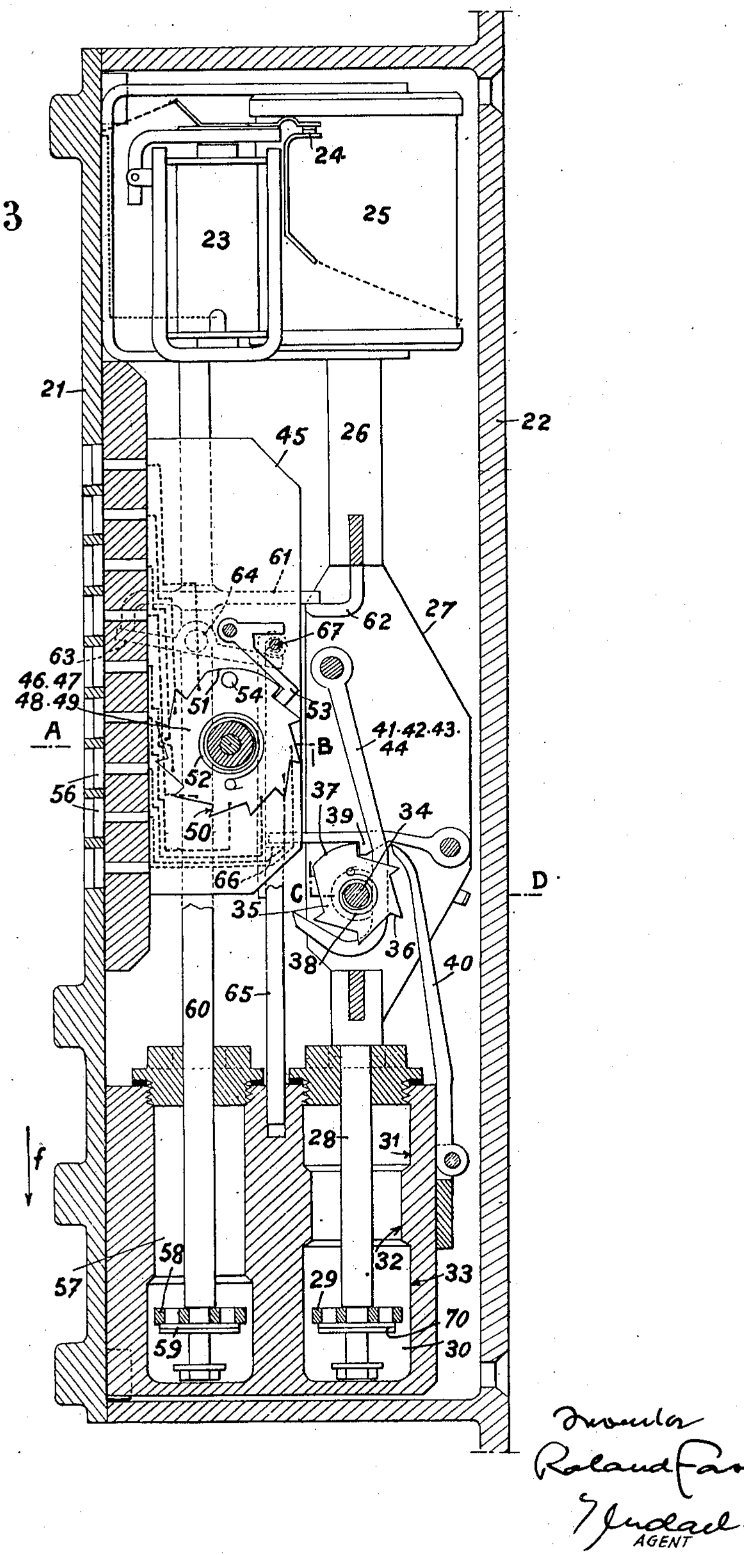
Fig. 3 is a vertical longitudinal section of the apparatus according to the invention as arranged at the receiving station.
Figure 4:
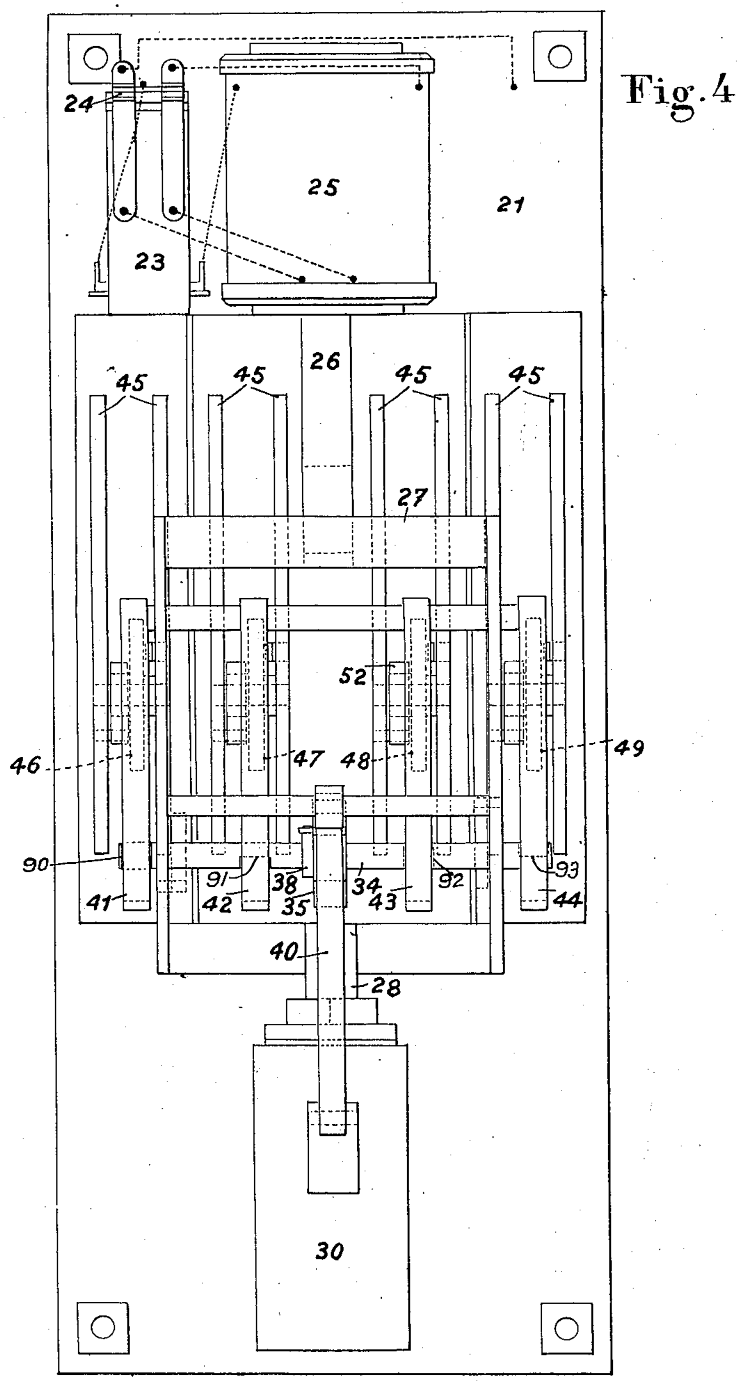
Fig. 4 is a back view, the cover which constitutes the base being removed.

Frame 27 is located in a plane parallel to that of plate 21 and in said frame is journalled an axle 34 right-angled to core 26 and bearing a ratchet wheel 35 provided with four teeth 36 shifted by 60 degrees with respect to each other and with a solid cylindrical part 37 constituting the rest of the ratchet periphery. Axle 34 is continuously urged by a helical spring 38 towards the original normal position shown in Fig. 3. A retaining pawl 39 is adapted to prevent ratchet 35 from rotating clockwise (Fig. 3), while a resilient pawl 40 provided on cylinder 30 of the dash-pot may be engaged over one tooth 36 of ratchet 35 when the latter is moved with frame 27 and core 26 towards the dash-pot so as to rotate said ratchet anti-clockwise. The whole moving assembly of core 26, frame 27 and piston 29 tends under the action of its weight to move downwards in the direction of arrow *f*. Now if the apparatus were located so that core 26 be horizontal, a spring would urge the whole of this moving system towards the dash-pot. When under the attraction of core 26 by magnet 25 the moving system is lifted, the resilient pawl 40 yields and accommodates ratchet 35, but during the return stroke of the assembly towards the normal position, one tooth 36 is engaged against pawl 40 and rotates the ratchet by one tooth. Ratchet 35 may thus be brought into four different positions by the four teeth 36. On axle 34 of the ratchet, bear four hooks 41, 42, 43, 44 acting as springs and parallel to each other and to the axis of core 26, and opposite said hooks, axle 34 is provided with four flat portions 90, 91, 92, 93 (Fig. 4) angularly shifted with respect to each other by 60 degrees and corresponding to the four positions of ratchet 35. On plate 21 are securely fixed parallel walls 45 in which are journalled four ratchet wheels 46, 47, 48, 49 comprising nine teeth 50 angularly shifted by 30 degrees with respect to each other and a solid cylindric portion 51 constituting the rest of the ratchet periphery. Said ratchets 46, 47, 48, 49 are urged back by means of a helical spring 52 towards the original normal position. The spring-hooks 41, 42, 43, 44 are so designed that when one of them bears on the flat portion corresponding thereto on axle 34, the free end of said hook is engaged in the teeth of one ratchet 46, 47, 48, 49 when the moving systems 26, 27, 29 is lifted, while the three other spring-hooks remain in contact with a normal portion of axle 34 and are separated from ratchets 46, 47, 48, 49 during the motions of moving system 26, 27, 29. Retaining pawls 53 are adapted to prevent ratchets 46, 47, 48, 49 from rotating clockwise.

Figure 6:
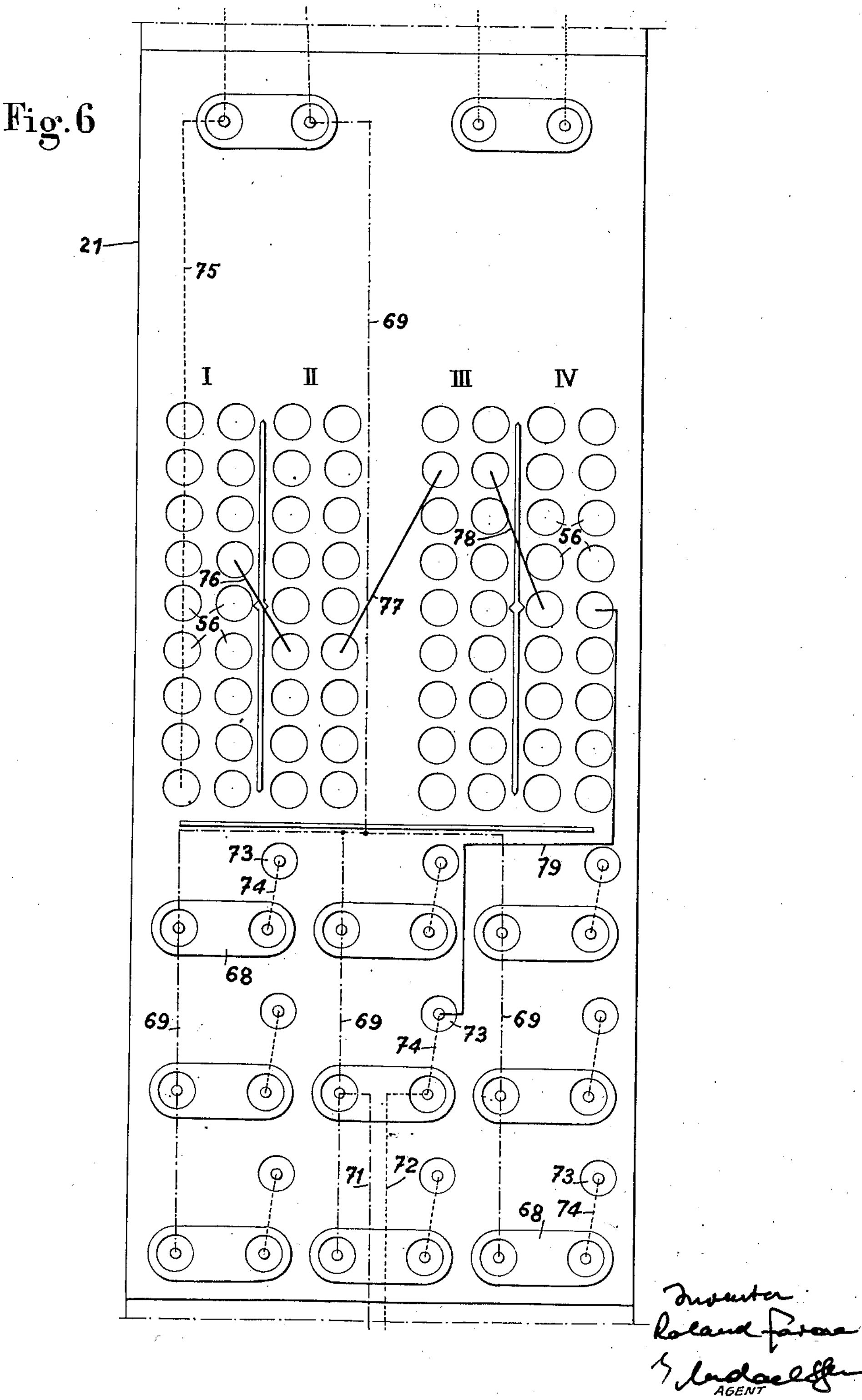
Fig. 6 is a view of the outer face of the plate of the apparatus cabinet, said face holding the plugs of the connections to be established.

Each one of ratchets 46, 47, 48, 49 is provided with two contacts 54 arranged opposite each other and pushed in opopsite directions by a spring so that said contacts respectively project above the two faces of the ratchet. During the rotation of said ratchets each one of the contacts supported thereon wipes successively on the contact studs 55 of a nine-stud crown supported by walls 45. Said studs 55 are located on a circumference coaxial with the axes of ratchets 46, 47, 48, 49 thirty degrees from each other. Each position of one ratchet 46, 47, 48, 49 thus short-circuits two studs similarly numbered and located on two opposite walls respectively. Each stud 55 of one wall is connected by a lead to a tap socket 56 provided on the outer face of plate 21. Said plate thus supports eight rows each one of which comprises nine sockets corresponding to the studs 55 supported by the walls (Fig. 6). Cords terminated by plugs allow connections between circuits 56 to be established.

A second dash-pot is located near the first but cylinder 57 of said second dash-pot has a uniform diameter just accommodating piston 58 provided with a flap valve 59. Rod 60 of piston 58 is parallel to core 26 and is provided with an abutment 61 which may be driven by the motion of core 26 through an abutment 62 integral with moving system 26, 27, 29.

A forked arm 63 pivoted about an axle 64 carried on rod 60 (Figs. 3 and 5) is pushed at one of its ends by an extension of abutment 61 when rod 60 reaches the lowermost point of its stroke, and for said position of rod 60 said arm 63 pushes in turn at its other end a first abutment 67 carried on a rod 65 carrying also a second abutment 66. The abutments 66 and 67 are intended to cooperate with retaining pawls 39 and 53 and to separate said pawls from their ratchet-wheels so that the latter may come back to their normal position under the action of helical springs 38 and 52. When the apparatus is at rest, abutment 61 pushes arm 63 in such manner that abutments 67 and 66 are raised together with rod 65, whereby the pawls 39 and 53 are brought away from the wheels 35 and 46 to 49.

Plate 21 also supports nine pairs of sockets 68, both sockets of each pair being connected by leads 71 and 72, respectively, with the input and output terminals of one apparatus to be controlled. (In Fig. 6 are only shown the leads corresponding to the apparatus connected with the central socket pair.) In the assumed example it is thus possible to control nine apparatuses. The nine pairs of sockets 68 have one of their sockets connected by leads 69 to one pole of the current source while the other socket of each pair is connected to another socket 73 through a lead 74. The other pole of the current source is connected through lead 75 to all sockets 56 of the first socket row.

The installation described operates as follows:

Let us assume that the operator wishes to remotely control the apparatus which is connected to socket pair 68 located at the mid-point of the eight other pairs and he has selected number 462 as a key to close simultaneously the safety switches constituted by ratchets 46, 47, 48. The operator will have previously effected at the receiving station the following operations:

Closing the switch interposed in the circuit of magnet 23 connected to the bell; interconnecting through leads 76, 77, 78, 79 the fourth socket 56 of the second row with the sixth socket of the third row, the sixth socket of the fourth row with the second socket of the fifth row, the second socket of the sixth row with the fifth socket of the seventh row and the fifth socket of the eighth row with socket 73 added to the central pair of sockets 68, respectively.

When the operator is far from his home and wishes to control the described apparatus he enters any public automatic telephone booth, dials his own call number and hears the successive trills of the ringing. After the fourth trill, the operator hangs up the handset. During this call the following operations have taken place; magnet 23 connected to the bell has been fed with four electric pulses of which the very low intensity does not at all impair the operation of the bell. The first of said pulses closes contacts 24 so that magnet 25 is operated and completely attracts in the direction opposite to that of arrow *f*, core 26, which drives with it frame 27 and piston 29 as well as rod 60 and piston 58 of the second dash-pot due to the action of abutment 62 upon abutment 61. Abutment 61 is thus moved away from arm 63, and rod 65 moves downwards together with pawls 39 and 53 under the action of gravity, thereby pivoting arm 63 clockwise (Fig. 3) and engaging pawls 39 and 53 with the wheels 35 and 46 to 49. Pistons 29 and 58 of the dash-pots offer in this case no resistance, since the liquid contained in the dash-pots lifts flap-valves 70 and 59. During these motions the first spring-hook 41 bears on one of the flat portions 90 of axle 34 and therefore drives by one tooth the first ratchet wheel 46.

When the first pulse in the bell is completed, the moving systems are restored by their weight (or by their return springs) in the direction of arrow *f*. But this time the dash-pots slow down this return motion. System 58—60 moves slowly downwards since piston 58 compresses the fluid behind it and since only a small leakage allows piston 58 to come back to its original position, said leakage being calculated so that the return motion is only completed after a time interval of three minutes for example. On the contrary the system 26—27—29 moves rapidly downwards at once and piston 29 travels for example in one second along the length of bore 31. This motion is sufficient for hook 41 to be moved backwards by one tooth of ratchet 46 but ratchet 35 does not move up to pawl 40 so that hook 41 remains in contact with its flat portion 90. When piston 29 reaches bore 32 it is slowed down in turn and can only travel along the length of said bore 32 in a time interval of 10 seconds for example. Piston 29 cannot move past said bore since the second pulse takes place about three seconds after the completion of the first one. Said second pulse causes anew a motion of the moving system in the direction opposite to that of arrow *f* which causes the rotation of ratchet 46 by a new tooth. The third and fourth pulses similarly move forwards ratchet 46 by a third and a fourth tooth respectively. Before a fifth trill is capable of beginning, the operator hangs up the telephone receiver of the transmitting station so that when the bell stops operating after this first call, ratchet 46 has established a contact between the two studs 55 numbered 4 of the two walls 45 adjacent to ratchet 46. Since magnets 23 and 25 are no more operated, both moving systems move backwards towards their normal position. System 26, 27, 29 may reach its normal position since it needs only ten seconds for travelling along bore 32 and one second for each one of bores 31 and 33; during this backward motion ratchet 35 will meet pawl 40 which will rotate ratchet 35 by one tooth and therefore will bring under spring-hook 42 the flat portion 91 which corresponds thereto on axle 34 while spring-hook 41 leaves its flat portion 90 and bears on the normal portion of axle 34. On the contrary system 58—60 will not reach its normal position since it needs three minutes therefor and the operator will recall its own telephone number about fifteen seconds after his first call.

During the second call of his own number the operator hangs up the receiver this time after six trills of the ringing. The operations of the first call are repeated and upon completion of the call the two studs 55 numbered 6 of the two walls adjacent to ratchet 47 will be interconnected through contacts 54 of ratchet 47 and axle 34 will rotate so as to bring the new spring-hook 43 against its corresponding flat portion 92 on said axle 34.

During the third call the operator will hang up the receiver after the second trill so that a contact will be established between the two studs 55 numbered 2 of the walls adjacent to ratchet 48.

The three safety switches constituted by ratchets 46, 47 and 48 thus will have completed the key combination 462.

The operator then sends a fourth call but this time he will not hang up. After the fifth trill, studs 55 numbered 5 of the two walls adjacent to ratchet 48 are interconnected.

From that moment the circuit of the apparatus to be controlled is closed through lead 75, ratchets 46, 47, 48 and 49, socket 73 and the pair of sockets 68 corresponding to the apparatus to be controlled, lead 72, the apparatus to be controlled, and back to the source through leads 71 and 69. The operator keeps the receiver against his ear in order to hear the signal which will be sent to him by the receiving station to inform him that his order has been carried out.

Fig. 9 shows the device used for this purpose. The telephone set 80 of the receiving station is provided under the switch hook 81 to which the receiver is usually hung up, with a magnet 82 of which the moving core 85 extending to near the switch-hook 81 is lifted when magnet 82 is fed with the current which at the same time lifts hook 81. The coil of magnet 82 is connected in an electric circuit fed from a current source 83 and in which are interposed switches 84 connected in parallel with each other and each of which corresponds to one apparatus to be controlled. Each one of said switches is designed so as to close and to open again at once as the apparatus to be controlled is operatively connected, by means of any suitable link connecting the switch with the apparatus. Thus if the apparatus is such that it causes the motion of certain parts, one of said parts may be connected through a system of rods with the particular switch. If it is an apparatus producing heat a two-blade device with a relay may also ensure the closing of the switch. If it is an apparatus through which passes an electric current, magnets or any other current responsive devices may be used. It will be understood therefore that when the apparatus to be controlled will have been operatively connected upon the working of the operator at the transmitting station, the particular apparatus will close the corresponding switch 84, magnet 82 will be operated and switch-hook 81 will be lifted and then lowered which will produce in the telephone line, pulses generating in the telephone receiver of the transmitting station a clearly recognizable tone which will positively inform the operator that the operation to be effected has been carried out. The operator may then finally hang up his receiver to the telephone set through which he has sent his various calls. Since the pulses then stop, the two moving systems will come back towards their normal position and after three minutes both dash-pots will be restored in their original position and arm 63 pushed by the extension of abutment 61 will have been tilted thus separating retaining pawls 39 and 53 so as to allow the ratchet wheels to come back also to their original position. If the operator does not hear the signal it will indicate that there has been a false operation and he must start again.

In the case when, due to a false working, the operator would allow during a call the bell of the receiving station to generate more than nine pulses, the corresponding hook 41, 42, 43 or 44 would slide on the cylindric portion 51 of the corresponding ratchet wheel 46, 47, 48, 49 without having any new action upon said wheel. The cylindric portion 37 of ratchet wheel 35 acts in the same manner when the operator sends more than four successive calls.

If it is desired to control simultaneously another apparatus with the same key number 462, for instance the apparatus corresponding to the first socket pair 68 on the upper left side of plate 21, it will be sufficient to further connect the second socket 56 of the sixth row with the first socket 56 of the seventh row and the first socket 56 of the eighth row with the socket 73 added to the first socket pair 68.

If said apparatus corresponding to the first socket pair 68 is to be controlled independently of the apparatus corresponding to the central socket pair, another key number is then chosen, for instance the number 735, and at the receiving station the further following connections will be effected: the seventh socket 56 of the second row with the third socket of the third row, the third socket of the fourth row with the fifth socket of the fifth row, the fifth socket of the sixth row with the first socket of the seventh row and the first socket of the eighth row with the socket 73 added to the first socket pair 68.

If the town from which the operator calls cannot be connected with his own telephone set by an automatic network, the operator may call a telephone office which is interconnected with his own set by such an automatic network and charge an attendant appointed for this purpose to send the various successive calls with hanging up at the required times as stated above.

The details of the embodiment of this method and the construction details given above has been only mentioned as an illustration within the scope of this invention. It is to be understood that the delay devices constituted by ratchet wheels 46, 47, 48, 49 may be substituted for by other delay devices acting in a similar manner. The dash-pots may be also substituted for by any other mechanical or electrical devices fulfilling the same function. Magnet 2 may be substituted for by any other current responsive means. It is clear therefore that many modifications may be made to the described illustration within the scope of the invention.

What I claim as new is:

1. An outfit for controlling an electric operating circuit in a receiving station comprising a determined number of selectors, each having a plurality of successive fixed contacts arranged in succession on a circumference and a wiper rotatably mounted coaxially with said circumference and adapted to be actuated step by step from one fixed contact to the following one, the fixed contacts of one extreme selector being connected with one side of said electric operating circuit and the wiper of the other extreme selector being connected with the other side of said electric operating circuit: removable connecting means adapted to connect the wiper of each selector with any one of the fixed contacts of the following selector, whereby said selectors may be inserted in series in said electric operating circuit, a ratchet wheel operatively connected with each rotatable wiper, an electromagnet adapted to be temporarily energized by electric pulses, an armature adapted to be attracted by said electromagnet, a reciprocating carrier rigid with said armature and yieldingly urged in an inoperative position away from said electromagnet, pawls equal in number to said number of selectors and pivotally mounted on said reciprocating carrier and each adapted to engage the ratchet wheel of the wiper of the corresponding selector and to rotate said ratchet wheel when said carrier is moved towards said electromagnet, timing means adapted to delay the return movement of said carrier to its inoperative position, and selecting means controlled by said electromagnet and adapted to bring one of said pawls in engagement and the other pawls out of engagement with their corresponding ratchet wheels when said carrier is moved toward said electromagnet.

2. An outfit according to claim 1 further comprising a bell of a telephone set, a second electromagnet adapted to be connected with the terminals of said telephone bell, and a switch inserted in the first electromagnet and controlled by said second electromagnet.

3. An outfit for controlling an electric operating circuit in a receiving station comprising in combination a supporting plate, a plurality of parallel pairs of fixed walls carried on one side of said plate, an auxiliary ratchet wheel rotatably mounted between the two walls of each of said pairs, a number of fixed studs carried on the side of each wall facing the corresponding ratchet wheel and disposed on a circumference coaxial with the ratchet wheel, a movable contact protruding on both faces of each ratchet wheel and adapted to be brought simultaneously against any two corresponding fixed studs of the two adjacent fixed walls, electrical sockets carried on the other side of said plate and equal in number to the fixed studs on all of said fixed walls and electrically connected respectively with their corresponding studs, all the sockets corresponding to one extreme wall being electrically connected together and adapted to be connected with one pole of a source of current, a main removable connecting lead adapted to be inserted on one side in any one of the sockets corresponding to the studs of the other extreme wall and on the other side connected with one terminal of the operating circuit to be controlled, means adapted to connect the other pole of said source of current with the other terminal of said operating circuit, auxiliary removable connecting leads adapted to be inserted on one side in any one of the sockets corresponding to the studs of an intermediate wall in one pair and on the other side in any one of the sockets corresponding to the studs of another intermediate wall in another pair, an electromagnet carried on said plate on the same side as said ratchet wheels and adapted to be traversed by electric pulses, an armature adapted to be attracted by said electromagnet a frame rigid with said armature and yieldingly urged in an inoperative position away from said electromagnet, a piston connected with said frame, a fixed cylinder carried on said plate and provided with inner sections of different diameters and in which said piston is adapted to reciprocate and to be delayed in its movement away from said electromagnet, auxiliary pawls equal in number to said auxiliary ratchet wheels and pivotally mounted on said frame and adapted to be engaged in their corresponding ratchet wheels and to rotate the same when said frame moves toward said electromagnet, a shaft rotatably mounted on said frame, a main ratchet wheel carried on said shaft, a fixed main pawl supported on said plate and adapted to engage said main ratchet wheel and to rotate the same when said frame moves away from said electromagnet, and cam surfaces on said shaft cooperating with said auxiliary pawls and adapted to bring one of said pawls in cooperation and the other pawls out of cooperation with their corresponding auxiliary ratchet wheels.

4. An outfit according to claim 3 further comprising a bell of a telephone set, a second electromagnet carried on said plate and adapted to be connected with the terminals of said telephone bell and a switch inserted in the first electromagnet and controlled by said second electromagnet.

5. An outfit according to claim 3 further comprising a cover adapted to be applied on said supporting plate and to enclose all the parts supported on said one side of said plate.

6. An outfit according to claim 3 further comprising spring means urging each main or auxiliary ratchet wheel in an initial inoperative position, a retaining pawl pivoted on said frame and adapted to engage said main ratchet wheel and to prevent said wheel from rotating towards its inoperative position, retaining pawls pivoted on said plate and adapted to engage said auxiliary ratchet wheels and to prevent said auxiliary wheels from rotating towards their inoperative position, and means actuated by said frame and adapted to disengage said retaining pawls from said main and auxiliary ratchet wheels when said frame returns to its inoperative position.

7. An outfit for controlling an electric operating circuit in a receiving station comprising in combination a supporting plate, a plurality of parallel pairs of fixed walls carried on one side of said plate, an auxiliary ratchet wheel rotatably mounted between the two walls of each of said pairs, a number of fixed studs carried on the side of each wall facing the corresponding ratchet wheel and disposed on a circumference coaxial with the ratchet wheel, a movable contact protruding on both faces of each ratchet wheel and adapted to be brought simultaneously against any two corresponding fixed studs of the two adjacent fixed walls, electrical auxiliary sockets carried on the other side of said plate and equal in number to the fixed studs on all of said fixed walls and electrically connected with their corresponding studs, at least one pair of main sockets carried on said other side of said plate and adapted to be electrically connected the first with one terminal of the operating circuit to be controlled and the second with the other terminal of said operating circuit and with one pole of a source of current, all the auxiliary sockets corresponding to one extreme wall being electrically connected together and adapted to be connected to the other pole of said source of current, a main removable connecting lead adapted to be inserted on one side in any one of the auxiliary sockets corresponding to the studs of the other extreme wall and on the other side in said first main socket not directly connected with the source of current, auxiliary removable connecting leads adapted to be inserted on one side in any one of the auxiliary sockets corresponding to the studs of an intermediate wall in one pair and on the other side in any one of the auxiliary sockets corresponding to the studs of another intermediate wall in another pair, an electromagnet carried on said plate on the same side as said ratchet wheels and adapted to be traversed by electric pulses, an armature adapted to be attracted by said electromagnet, a frame rigid with said armature and yieldingly urged in an inoperative position away from said electromagnet, a piston connected with said frame, a fixed cylinder carried on said plate and provided with inner sections of different diameters and in which said piston is adapted to reciprocate and to be delayed in its movement away from said electromagnet, auxiliary pawls equal in number to said auxiliary ratchet wheels and pivotally mounted on said frame and adapted to be engaged in their corresponding ratchet wheels and to rotate the same when said frame moves toward said electromagnet, a shaft rotatably mounted on said frame, a main ratchet wheel carried on said shaft, a fixed main pawl supported on said plate and adapted to engage said main ratchet wheel and to rotate the same when said frame moves away from said electromagnet, and cam surfaces on said shaft cooperating with said auxiliary pawls and adapted to bring one of said pawls in cooperation and the other pawls out of cooperation with their corresponding auxiliary ratchet wheels.

ROLAND FAVRE.

REFERENCES CITED

The following references are of record in the file of this patent:

UNITED STATES PATENTS

| Number | Name | Date |
|---|---|---|
| 275,296 | Vail | Apr. 3, 1883 |
| 854,543 | Terhune et al. | May 21, 1907 |
| 1,712,725 | Bennett | May 14, 1929 |
| 1,726,947 | Chauveau | Sept. 3, 1929 |
| 1,765,554 | Wensley | June 24, 1930 |
| 1,820,354 | Leeson | Aug. 25, 1931 |
| 2,021,382 | Reibek | Nov. 19, 1935 |
| 2,253,840 | Bloxsom | Aug. 26, 1941 |